US010570716B2

(12) United States Patent
Balan et al.

(10) Patent No.: US 10,570,716 B2
(45) Date of Patent: *Feb. 25, 2020

(54) CONTROLLING HYDROCARBON PRODUCTION

(71) Applicant: Saudi Arabian Oil Company, Dhahran (SA)

(72) Inventors: Huseyin Onur Balan, Houston, TX (US); Anuj Gupta, Katy, TX (US); Daniel T. Georgi, Houston, TX (US); Ali Alkhatib, Dhahran (SA); Alberto F. Marsala, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,217

(22) Filed: Jun. 19, 2018

(65) Prior Publication Data
US 2018/0298752 A1 Oct. 18, 2018

Related U.S. Application Data

(63) Continuation of application No. 15/690,600, filed on Aug. 30, 2017, now Pat. No. 10,125,586.
(Continued)

(51) Int. Cl.
*E21B 43/20* (2006.01)
*E21B 47/10* (2012.01)
(Continued)

(52) U.S. Cl.
CPC .............. *E21B 43/20* (2013.01); *E21B 34/06* (2013.01); *E21B 43/162* (2013.01); *E21B 47/10* (2013.01);
(Continued)

(58) Field of Classification Search
CPC .......... E21B 49/00; E21B 34/06; E21B 43/20; G01V 99/005; G01V 7/06; G01V 1/308; G01V 3/18
See application file for complete search history.

(56) References Cited

U.S. PATENT DOCUMENTS 4,676,313 A * 6/1987 Rinaldi ................... E21B 43/12
166/250.15
7,937,222 B2  5/2011 Donadille et al.
(Continued)

FOREIGN PATENT DOCUMENTS

CA      2856274      3/2016
WO    2014144917    9/2014
(Continued)

OTHER PUBLICATIONS

Gulf Cooperation Council Examination Report issued in GCC Application No. GC 2017-33917 dated Feb. 24, 2019, 4 pages.
(Continued)

*Primary Examiner* — Brad Harcourt
(74) *Attorney, Agent, or Firm* — Fish & Richardson P.C.

(57) ABSTRACT

Techniques for controlling hydrocarbon production includes (i) identifying a plurality of reservoir measurements of a subterranean hydrocarbon reservoir located between at least one injection wellbore and at least one production wellbore; (ii) processing the identified plurality of reservoir measurements to generate a petrophysical model of the subterranean hydrocarbon reservoir; (iii) determining, based on the petrophysical model, a flow of an injectant from the injection wellbore toward the production wellbore; and (iv) adjusting an inflow control device (ICD) positioned about the production wellbore based on the determined flow of the injectant.

20 Claims, 10 Drawing Sheets

Related U.S. Application Data

(60) Provisional application No. 62/383,240, filed on Sep. 2, 2016.

(51) Int. Cl.
| | | |
|---|---|---|
| *E21B 34/06* | (2006.01) | |
| *E21B 49/00* | (2006.01) | |
| *G01V 99/00* | (2009.01) | |
| *E21B 43/16* | (2006.01) | |
| *G01V 1/30* | (2006.01) | |
| *G01V 3/18* | (2006.01) | |
| *G01V 7/06* | (2006.01) | |

(52) U.S. Cl.
CPC ............ *E21B 49/00* (2013.01); *G01V 99/005* (2013.01); *G01V 1/308* (2013.01); *G01V 3/18* (2013.01); *G01V 7/06* (2013.01)

(56) References Cited

U.S. PATENT DOCUMENTS

| | | | |
|---|---|---|---|
| 8,803,077 | B2 | 8/2014 | Schmidt |
| 10,125,586 | B2 * | 11/2018 | Balan .................... E21B 43/162 |
| 2009/0164188 | A1 * | 6/2009 | Habashy ................. E21B 43/00 703/10 |
| 2011/0042083 | A1 | 2/2011 | Sierra et al. |
| 2012/0016649 | A1 | 1/2012 | Thambynayagam et al. |
| 2014/0180658 | A1 | 6/2014 | Rossi |
| 2015/0370934 | A1 | 12/2015 | Pride et al. |
| 2016/0282881 | A1 | 9/2016 | Filippov |

FOREIGN PATENT DOCUMENTS

| | | |
|---|---|---|
| WO | 2015016932 | 2/2015 |
| WO | 2015167935 | 11/2015 |

OTHER PUBLICATIONS

Ali et al., "Constraining Interwell Water Flood Imaging with Geology and Petrophysics: An Example from the Middle East," Paper presented at the 2009 SPE Middle East Oil & Gas Show and Conference, Bahrain, Mar. 15-18, 2009, SPE 120558; 11 pages.

Wilt et al., "Monitoring a Water Flood of Moderate Saturation Changes with Crosswell Electromagnetics (EM): A Case Study from Dom Joao Brazil," Paper presented at the SEG Las Vegas 2012 Annual Meeting, 2012; 4 pages.

Marsala et al., "3D inversion practice for crosswell electromagnetic surveys in horizontal wells in Saudi Arabia," 85th Annual International Meeting, SEG, 2015; 4 pages.

Marsala et al., "Crosswell electromagnetic induction between two widely spaced horizontal wells: Coiled-tubing conveyed data collection and 3D inversion from a carbonate reservoir in Saudi Arabia," 85th Annual International Meeting, SEG, 2015; 4 pages.

Giles, "Multilevel Monte Carlo path simulation," Operations Research, vol. 56, No. 3, May-Jun. 2008; pp. 607-617.

Alkhatib et al., "Robust Quantification of Uncertainty in Heterogeneity for Chemical EOR Processes: Applying the Multi-Level Monte Carlo Method," Paper presented at the SPE Middle East Oil & Gas Show and Conference, Bahrain, Mar. 8-11, 2015; 13 pages.

Tatang et al., "An efficient method for parametric uncertainty analysis of numerical geophysical models," Journal of Geophysical Research, vol. 102, No. D18, Sep. 27, 1997; pp. 21,925-21,932.

Li et al., "A Comparative Study of the Probabilistic-Collocation and Experimental-Design Methods for Petroleum-Reservoir Uncertainty Quantification," SPE Journal, vol. 16, No. 2, Jun. 2011; pp. 429-439.

Liang et al., "Crosswell Electromagnetic Inversion Constrained by the Fluid-Flow Simulator," Paper presented at the SPE Annual Technical Conference and Exhibition, Florence, Italy, Sep. 19-22, 2010; 11 pages.

Marsala et al., "Crosswell Electromagnetic Tomography: from Resistivity Mapping to Interwell Fluid Distribution," Paper presented at the International Petroleum Technology Conference in Kuala Lumpur (IPTC 12229), 2008; 6 pages.

Marsala et al., "First Borehole to Surface Electromagnetic Survey in KSA: Reservoir Mapping and Monitoring at a New Scale," Paper presented at the SPE Annual Technical Conference and Exhibition (SPE-146348), Denver, Colorado, Oct. 30-Nov. 2, 2011; 10 pages.

Marsala et al., "Fluid Distribution Inter-Well Mapping in Multiple Reservoirs by Innovative Borehole to Surface Electromagnetic: Survey Design and Field Acquisition," Paper presented at the International Petroleum Technology Conference (IPTC-17045), Beijing, China, Mar. 26-28, 2013; 4 pages.

International Search Report and Written Opinion issued in International Application No. PCT/US2017/049310 dated Oct. 17, 2017; 12 pages.

* cited by examiner

CONTROLLING HYDROCARBON PRODUCTION

CROSS-REFERENCE TO RELATED APPLICATION

This application is a continuation of and claims the benefit of priority to U.S. patent application Ser. No. 15/690,600, filed on Aug. 30, 2017, which claims priority under 35 U.S.C. § 119 to U.S. Provisional Patent Application Ser. No. 62/383,240, filed on Sep. 2, 2016, the entire contents of which are incorporated by reference herein.

TECHNICAL FIELD

This document relates controlling hydrocarbon production and, more particularly, controlling hydrocarbon production with one or more inflow control devices.

BACKGROUND

Inflow control devices (ICD) and inflow control valves (ICV) may be used in hydrocarbon production wells to control the production of oil, gas, or both, along the well completion. They can be used to isolate specific well segments while allowing other segments to continue to contribute to production. Such devices may be useful when an injectant breakthrough occurs, for example, due to high permeability streaks which can be a result of areal and vertical heterogeneity of a reservoir. The ICDs, ICVs, or both, can be used to isolate the well segment that is in contact with a high conductivity, early injectant arrival path through the reservoir and maintain production from the other well segments that do not encounter this situation. Injectant breakthrough can occur suddenly, and there may be limited methods to detect it prior to its occurrence. Early injectant breakthrough can result in excessive injectant production and associated lifting and processing costs. It can also lead to loss of valuable reservoir drive energy provided by natural aquifer, gas-cap drive, or injectant and therefore may result in lower oil recovery compared to the true potential of a reservoir.

SUMMARY

In an example implementation, a computer-implemented method for controlling hydrocarbon production includes (i) identifying a plurality of reservoir measurements of a subterranean hydrocarbon reservoir located between at least one injection wellbore and at least one production wellbore; (ii) processing the identified plurality of reservoir measurements to generate a petrophysical model of the subterranean hydrocarbon reservoir; (iii) determining, based on the petrophysical model, a flow of an injectant from the injection wellbore toward the production wellbore; and (iv) adjusting an inflow control device (ICD) positioned about the production wellbore based on the determined flow of the injectant.

An aspect combinable with the general implementation further includes receiving the plurality of reservoir measurements from one or more sensors positioned at a terranean surface or in the reservoir.

In another aspect combinable with any of the previous aspects, the one or more sensors are positioned in the reservoir between the injection wellbore and the production wellbore.

In another aspect combinable with any of the previous aspects, the reservoir measurements include at least one of crosswell electromagnetic (EM), borehole EM, surface electromagnetics, gravity measurements, or 4D seismic.

In another aspect combinable with any of the previous aspects, at least one of the injection wellbore or the production wellbore includes a horizontal wellbore.

In another aspect combinable with any of the previous aspects, processing the identified plurality of reservoir measurements includes inverting the reservoir measurements to determine the petrophysical model.

In another aspect combinable with any of the previous aspects, the petrophysical model includes a water saturation value at a plurality of locations in the reservoir between the injection wellbore and the production wellbore.

In another aspect combinable with any of the previous aspects, inverting the reservoir measurements includes executing the Archie algorithm to the reservoir measurements.

In another aspect combinable with any of the previous aspects, determining the injectant flow includes determining a floodfront between the injection wellbore and the production wellbore.

In another aspect combinable with any of the previous aspects, the floodfront includes a sum of the water saturation and a hydrocarbon saturation value at the plurality of locations.

In another aspect combinable with any of the previous aspects, determining the injectant flow includes updating the petrophysical model.

In another aspect combinable with any of the previous aspects, updating the petrophysical model includes using a Bayesian inference with the plurality of reservoir measurements.

Another aspect combinable with any of the previous aspects further includes determining a threshold location between the injection wellbore and the production wellbore.

In another aspect combinable with any of the previous aspects, determining the flow of the injectant includes determining the flow of the injectant at the threshold location.

In another aspect combinable with any of the previous aspects, adjusting the ICD includes adjusting the ICD based on the flow of the injectant at the threshold location exceeding a predetermined value.

In another aspect combinable with any of the previous aspects, adjusting the ICD includes shutting the ICD.

Another aspect combinable with any of the previous aspects further includes executing an iterative process of steps (i) through (iv).

In another aspect combinable with any of the previous aspects, the iterative process includes comparing a previous plurality of reservoir measurements with a current plurality of reservoir measurements.

Another aspect combinable with any of the previous aspects further includes stopping the iterative process when a difference between the current plurality of reservoir measurements and the previous plurality of reservoir measurements is less than a threshold value.

One, some, or all of the implementations according to the present disclosure may include one or more of the following features. For example, implementations of an injectant flood detection system that incorporates, for instance, deep reservoir measurements (for example, crosswell electromagnetic (EM), borehole, surface electromagnetics, gravity measurements, 4D seismic, or a combination thereof) may detect a movement of secondary/tertiary flood front towards a production well earlier than conventional techniques. Implementations of an injectant flood detection system may respond to an approaching injectant flood front by controlling or adjusting ICDs or ICVs that can be used to mitigate early injectant breakthrough by throttling, restricting, or isolating the well-segments that will most likely encounter a breakthrough prior to the flood event. Implementations of an injectant flood detection system may activate selected ICDs to slow down a movement of arriving injectant-front and divert it to an unswept part of the reservoir. Implementations of an injectant flood detection system may execute a dynamic operation of the ICDs based on advanced detection of the secondary/tertiary flood front for optimizing oil production. In some aspects, an injectant flood detection system according to the present disclosure may provide for an enhanced sweep efficiency and increased oil recovery relative to conventional flood detection techniques. Implementations of an injectant flood detection system may also provide for an early detection of injectant front movement in a reservoir away from an injection well, optimal operation of ICDs and ICVs, prolonging of well life, and a reduction in produced injectant handling costs.

Implementations of the embodiments described in the present disclosure may include systems and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Table 1 includes nomenclature and abbreviations that may be used in the present disclosure:

TABLE 1

| Abbreviation | Term and Units |
| --- | --- |
| $B_o$ | oil formation volume factor in reservoir barrel per stock tank barrel (rb/stb) |
| $BHP_{max}$ | maximum bottomhole pressure constraint in pounds per square inch (psi) |
| $BHP_{min}$ | minimum bottomhole pressure constraint in pounds per square inch (psi) |
| k | permeability in milli-Darcies (mD) |
| $L_d$ | dimensionless distance between injection and production wells |
| $(L_d)_{opt}$ | dimensionless optimum location between injection and production wells |
| $P_{bp}$ | bubble point pressure in pounds per square inch (psi) |
| $P_i$ | initial reservoir pressure in pounds per square inch (psi) |
| $q_o$ | constant oil production rate constraint in stock tank barrels per day (stb/d) |
| $q_w$ | constant water injection rate constraint in stock tank barrels per day (stb/d) |
| $S_w$ | water saturation in fraction |
| $S_{wi}$ | initial water saturation in fraction |

The details of one or more embodiments are set forth in the accompanying drawings and the description. Other features, objects, and advantages will be apparent from the description and drawings, and from the claims.

DETAILED DESCRIPTION

This document discusses systems, methods, and computer-readable media for controlling hydrocarbon production from one or more production wellbores through control of one or more ICDs or ICVs that are positioned on the production wellbore based on detection of movement of a secondary or tertiary injection flood from one or more injection wellbores. For example, in some aspects, implementations of an injectant detection system and workflow described in the present disclosure may utilize deep reservoir measurement in managing and optimizing a secondary/tertiary flood of a reservoir in a systematic and robust approach. Further, the injectant detection system and workflow may determine (all or partially) reservoir transmissibility in a volume between the injection and production wells. The injectant detection system and workflow may also actively optimize production and ultimately increase the recovery factor from a reservoir.

Figures 1A, 1B:
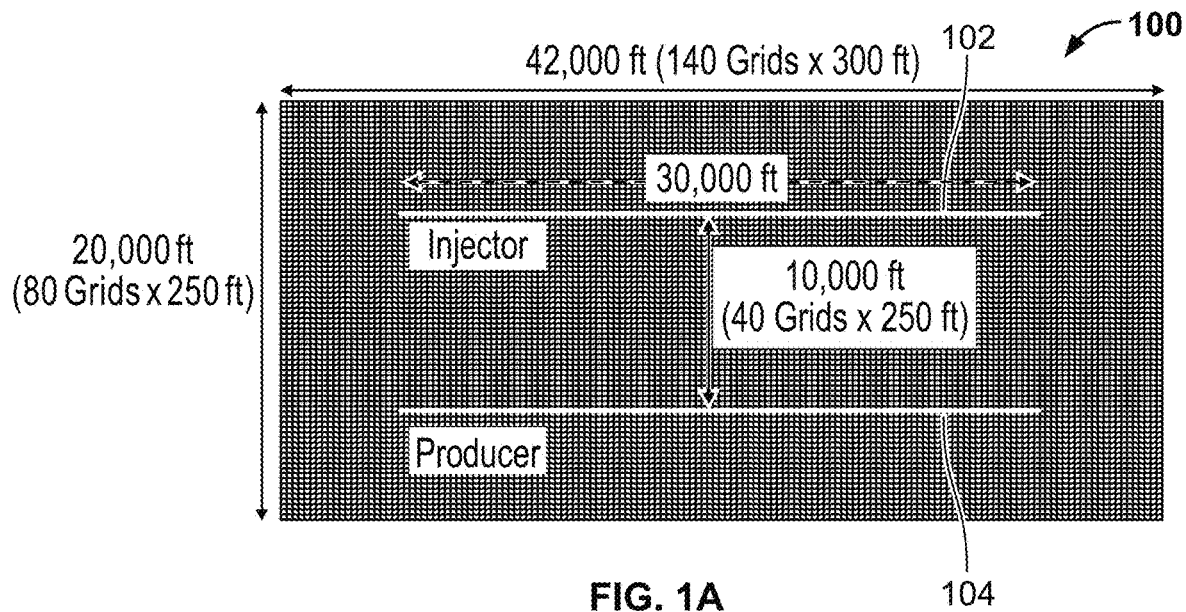
FIG. 1A illustrates a schematic diagram showing an injection wellbore and a production wellbore.
FIG. 1B illustrates a schematic diagram showing the injection wellbore and the production wellbore and multiple ICDs/ICVs positioned on the production wellbore, along with flood front detection locations between the injection and production wellbores.

FIG. 1A illustrates a schematic diagram showing a system 100 that includes an injection wellbore 102 ("injector") and a production wellbore 104 ("producer"). FIG. 1A illustrates a schematic plan view showing the wellbores 102 and 104 as single, horizontal wellbores separated by, in this example, 10,000 feet. In this example, each wellbore 102 and 104 extends horizontally through a hydrocarbon bearing formation, or reservoir, for 42,000 feet. Other example dimensions of the wellbores 102 and 104, as well as their distance apart, are contemplated by the present disclosure.

Wellbores 102 and 104 are illustrated as single leg, horizontal wellbores. Other types of wellbores are also contemplated by the present disclosure. For example, one or both of the injection wellbore 102 and the production wellbore 104 may be vertical wellbores. One or both of the injection wellbore 102 and the production wellbore 104 may have multiple laterals that extend from the respective wellbore. One or both of the injection wellbore 102 and the production wellbore 104 may be cased or uncased. In some aspects, although FIG. 1A illustrates the wellbores 102 and 104 as being of the same or similar vertical depth (for example, within a common horizontal plane in the reservoir), the wellbores 102 and 104 may be formed within the reservoir at different vertical depths. In some cases, there may be multiple wellbores 102 and a single wellbore 104, multiple wellbores 104 and a single wellbore 102, or multiple wellbores 102 and multiple wellbores 104 in a particular reservoir.

Generally, the injection wellbore 102 is used to inject a fluid therethrough and into the reservoir in a secondary or tertiary recovery process. For example, a fluid, such as water or gas, may be pumped through the wellbore 102 into the reservoir to maintain reservoir pressure so that hydrocarbons may be produced from the production wellbore 104. In some instances, for example, separated gas from the production wellbore 104 (or other producers) may be reinjected into the reservoir from the wellbore 102. In some cases, such as offshore wells, water may be injected into the reservoir from the wellbore 102.

Sweep efficiency, for example, is a measure of the effectiveness of an injection process to help boost hydrocarbon recovery. Sweep efficiency, for example, depends on a volume of the reservoir contacted by the injected fluid, and may depend on many factors, such as an injection pattern, off-pattern wells, fractures in the formation, reservoir thickness, permeability and areal and vertical heterogeneity, mobility ratio, density difference between the injectant (the injected fluid) and the displaced fluid (the hydrocarbons to be produced, and flow rates).

FIG. 1B illustrates a schematic diagram showing the injection wellbore 102 and the production wellbore 104 and multiple ICDs/ICVs 106 positioned on the production wellbore, along with flood front detection locations between the injection and production wellbores 102 and 104. Generally, an ICD is a component installed as part of a well completion to help optimize production by equalizing reservoir inflow along a length of the wellbore. In some instances, as is shown in this figure, multiple ICDs can be installed along the reservoir section of the wellbore 104. Each ICD 106 can be configured to a specific setting to partially choke flow of hydrocarbons into the production wellbore 104. Thus, the ICDs 106 can be used to delay or direct hydrocarbons into particular sections of the production wellbore 104 by reducing an annular velocity across a selected interval of the wellbore 104.

Generally, an ICV is an active component (whereas, in some aspects, an ICD is a passive component) that can be controlled from a terranean surface to maintain flow conformance into the production wellbore 104. The ICV can also be controlled to stop unwanted fluids (for example, injectant fluid) from entering the wellbore 104. In some aspects, an ICV can be connected, for control purposes, to a cable that extends to the surface that provides electric conduits, hydraulic conduits, or both to relay commands from the surface to the ICV. Alternatively, or additionally, the ICV can be controlled from a downhole controller that is located, for example, in the injection wellbore 102 or production wellbore 104. In the present disclosure, the terms ICD and ICV are generally interchangeable, as both may refer to a flow control apparatus that can be controlled from the surface.

FIG. 1B illustrates the injection wellbore 102 and production wellbore 104 in a simulation of an injectant detection system and process according to the present disclosure. The injectant detection system and process can also control the ICDs 106 to control hydrocarbon production into the production wellbore 104 from the reservoir (for example, control flow rate and inflow location). Injection and production constraints are illustrated in FIG. 1B for the example simulation, which simulates a water flood injection from the wellbore 102 moving through the reservoir toward the wellbore 104.

Deep reservoir measurements can be taken at the surface or within the reservoir, itself. For example, in some aspects, deep reservoir measurements such as seismic, electromagnetic, and gravity measurements, may be taken by surface-located sensors. In alternative aspects, or in addition to such surface measurements, deep reservoir measurements may be taken by sensors in a subterranean zone of the reservoir, such as crosswell EM or borehole to surface EM sensors placed in one or both of the wellbores 102 and 104. Also, the dotted lines running parallel to the wellbores 102 and 104 illustrate example locations between these wellbores at which deep reservoir measurements may be taken within the reservoir (for example, in additional directional or vertical wellbores). The deep reservoir measurements may include, for example, crosswell EM, borehole, surface electromagnetics, gravity measurements, or 4D seismic surveys, or a combination thereof. As explained in more detail in the present disclosure, such measurements may be used to more accurately predict, for example, a waterflood, as well as predict such an event earlier.

Crosswell electromagnetic (EM), generally, involves applying inductive physics and vertical well 2D inversion to interrogate an inter-well resistivity distribution. Crosswell EM measures a physical parameter, such as the vertical magnetic component of the electromagnetic field transmitted through the reservoir. Crosswell EM may be applied to both pairs of vertical wells and pairs of horizontal wells. When the wells are oriented horizontally, sensors may be sensitive to both vertical and horizontal variations, transposing the inversion into a 3D problem. The EM data can be assembled into a digital geologic model to then constructs a 3D resistivity volume prior to inversion (described later).

Figure 2:
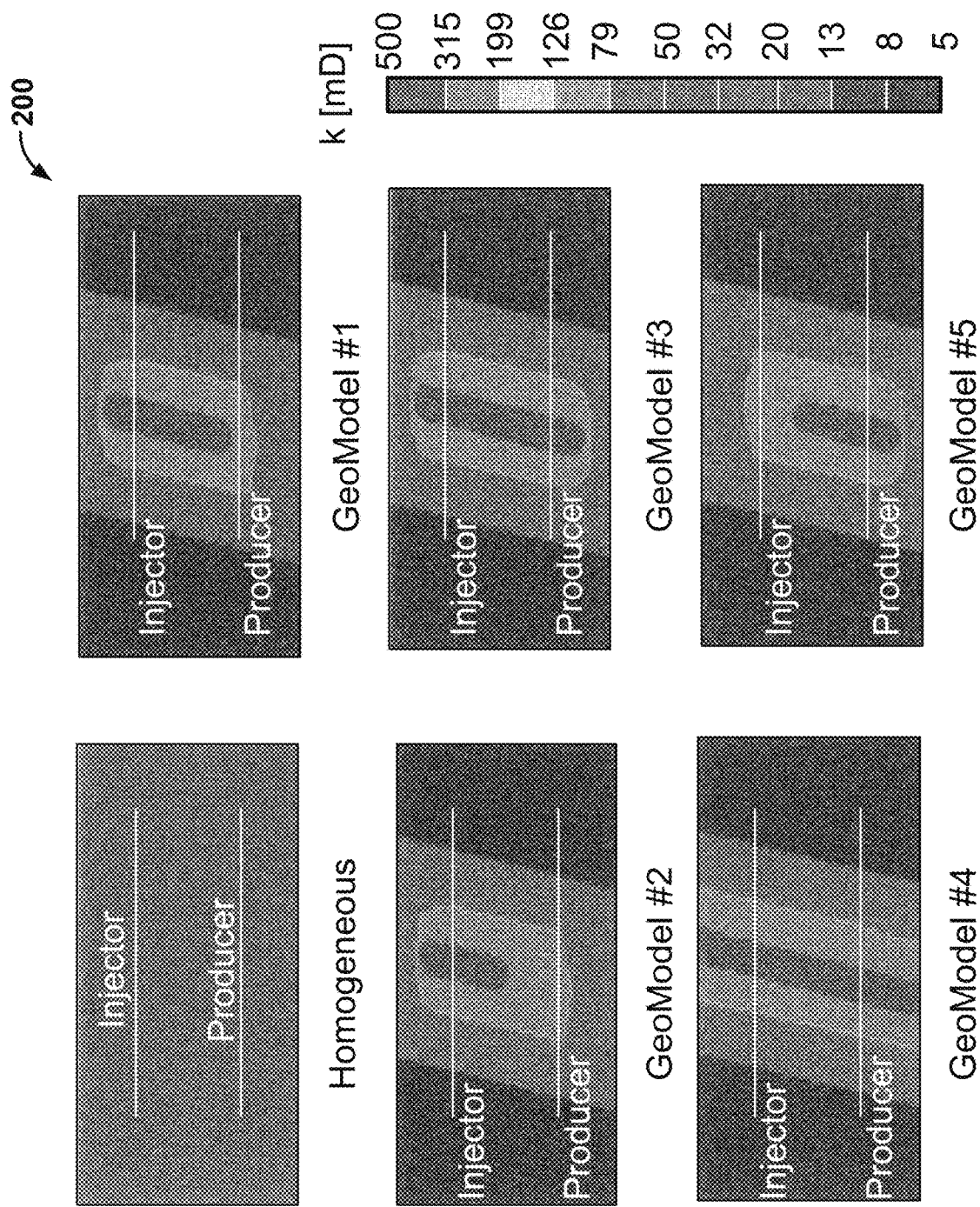
FIG. 2 illustrates several synthetic geomodels with different heterogeneity in a permeability field in a simulation model.

The simulation depicted in FIG. 2, and other subsequent figures, models a synthetic horizontal well pair (in other words, the wellbores 102 and 104) model built using a black-oil reservoir simulator to study performance of water-flooding in a single layer heterogeneous oil reservoir to demonstrate the injectant detection system and processes described in the present disclosure, which includes using information obtained from deep reading technology to control ICV/ICDs for optimizing waterfloods. The simulation results show that using ICV/ICDs at the horizontal production well 104 according to the injectant detection system and processes may significantly improve sweep efficiency and reduce water production. Further, early detection of water front with deep reading technologies provides incremental oil recovery. The simulation also shows that an optimum location for water-front detection may exist between the injector 102 and the producer 104 to improve oil production with specified injection and production constraints (for example, shown in FIG. 1B). Deep reading technologies may also provide valuable information about the mobility field between the well-pair to reduce uncertainty in heterogeneity, which can be used to update the geological model for better history matching, and forecasting production.

Conventionally, ICVs or ICDs may react after the breakthrough of an injectant at a production well. However, based on the simulation, in the injectant detection system and processes of the present disclosure, control of ICVs or ICDs 106 based on early front detection improves sweep efficiency and reduces water-to-oil ratio in horizontal waterfloods.

As noted, a single-layer simulation model (140×80 grids) with two horizontal wells (wellbores 102 and 104, as shown in FIG. 1B) is built to simulate waterflooding using any available black-oil reservoir simulator (for example, CMG-IMEX from Computer Modeling Group of Calgary, Alberta, Canada, or any other available reservoir simulator). The length of both wellbores 102 and 104 and the well spacing are 30,000 ft. and 10,000 ft., respectively. Since this is a single layer model, the gravity segregation is ignored and areal sweep efficiency is used as an indicator of increased recovery. Initial reservoir pressure is set to 4400 psi. Connate water saturation, which is equal to irreducible water saturation, is 0.2. Water is injected at a constant rate of 5500 bbl/day and at a maximum bottom-hole pressure of 5500 psi. Oil is produced at a constant rate of 5000 bbl/day (Oil Formation Volume Factor=1.1 rb/stb), which ensures voidage replacement. Bubble point pressure is set to 2000 psi. Minimum bottom-hole pressure assigned for the producer 104 is 2200 psi to prevent free gas generation around the producer 104. Independently acting ICDs 106 are assigned for each perforation on the horizontal producer 104. If water front is detected at the production well 104, a particular LCD 106 is shut in when watercut at the corresponding perforation is larger than 10%. If water front is detected at a distance from the production well 104, then a particular ICD 106 is shut in when water saturation in the assigned distant grid is larger than 0.2.

Figure 1C:
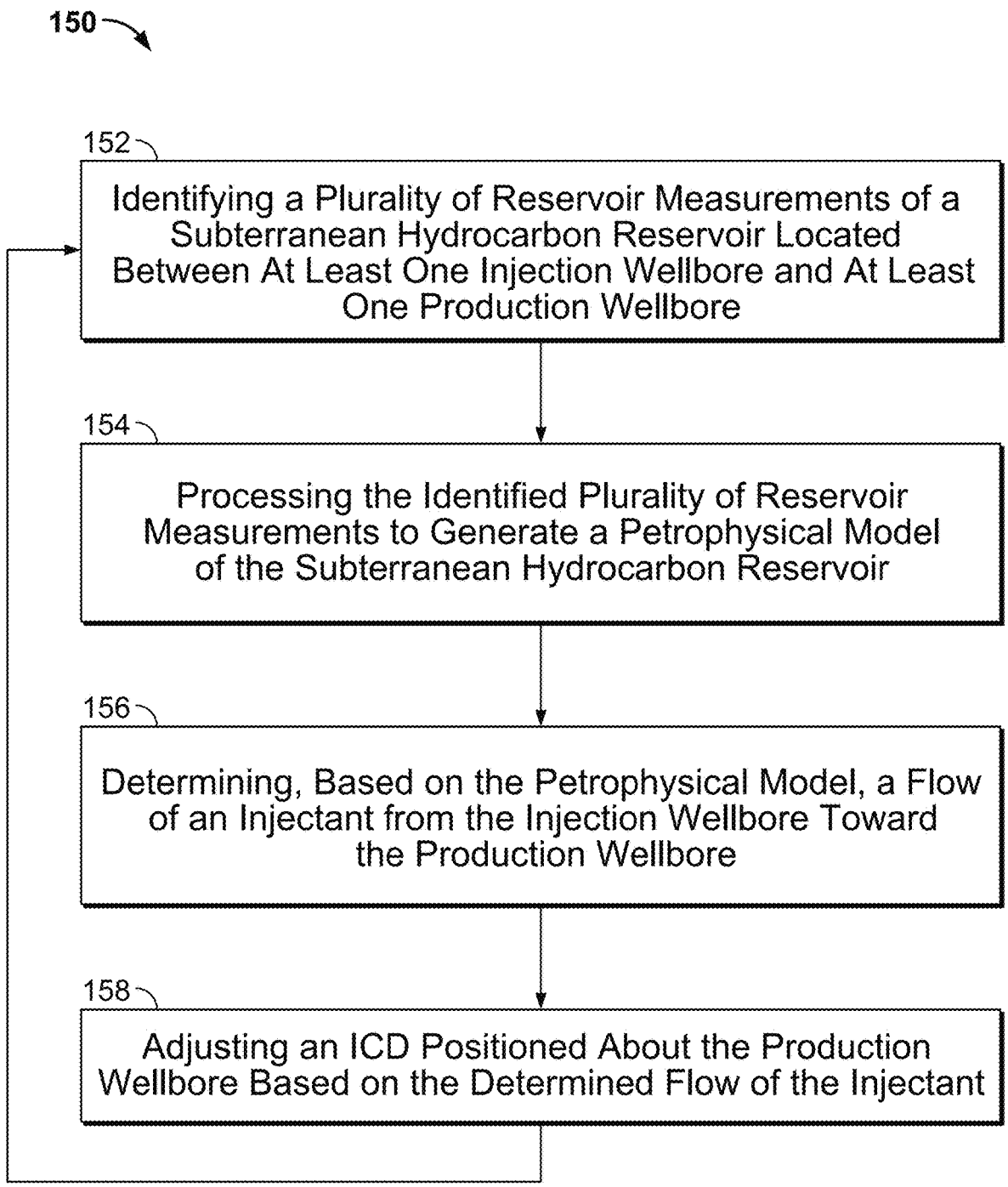
FIG. 1C illustrates an example method for controlling hydrocarbon production.

FIG. 1C illustrates an example method 150 for controlling hydrocarbon production. Method 150 may be executed, at least in part, by a control system or controller (for example, microprocessor based controller, PLC, electromechanical, electronic, pneumatic, or other form as appropriate) that is communicably coupled to control the ICDs and ICVs 106. The control system may include components as described with reference to FIG. 9.

Method 150 may begin at step 152, which includes identifying a plurality of reservoir measurements of a subterranean hydrocarbon reservoir located between at least one injection wellbore (102) and at least one production wellbore (104). For example as described, deep reservoir measurements may be taken from the surface or in the reservoir, such as crosswell EM, gravity, seismic, 4D seismic, or a combination thereof. In some aspects, the measurements may be taken prior to forming one or both of wellbores 102 and 104 and stored for later identification (for example, in a computer-readable database). In some aspects, such measurements may be performed in real time, for example, as or shortly after injectant is circulated through the wellbore 102 into the reservoir.

Method 150 may continue at step 154, which includes processing the identified plurality of reservoir measurements to generate a petrophysical model of the subterranean hydrocarbon reservoir. This step may include, for example, inversion of the plurality of reservoir measurements, such as inversion of the crosswell EM data. The inversion of such data may include, for example, obtaining a probable distribution of resistivity in the reservoir that is compatible with the measured data set of magnetic field. Thus, the inversion may be an inference of a resistivity distribution (for example, in a 3D cube volume) that is compatible with the measured data. Other processing techniques may also be applicable to other forms of measured deep reservoir data, such as pressure transients, temperature gradients, gravity, and other data.

The petrophysical model that results from the inversion can be a physical parameter, such as water or hydrocarbon saturation, distributed in the reservoir at a particular time. For example, the Archie equation (Equation 1) may be used to convert the inverted crosswell EM data to the petrophysical model:

$$Sw^n = \frac{a}{\phi^m}\left(\frac{R_w}{R_t}\right),$$  Equation 1 where $S_w$=water saturation, n=saturation exponent~2, $\phi$=porosity, m=an exponent, $R_w$=resistivity of water in the pore space, and $R_t$=formation resistivity. The Archie equation may be used to convert the deep reading resistivity (assumed to be $R_t$) to a water saturation, $S_w$. When $S_w$ is mapped spatially, a position of the water floodfront can be inferred. Other equations may be used as well. For example, an algorithm other than the Archie equation that can compute water saturation from the reservoir measurements may be used in step 154. Further, in some examples, the reservoir may be comprised of a rock formation that is incompatible with the Archie equations, such as a shale sand. In such formations, another model for computing water saturations for those types of reservoirs may be used.

Resistivity at each grid-block (shown in FIG. 1A) interpreted from crosswell EM surveys can be converted to water saturation using appropriate petrophysical relationships (such as Equation 1) and compared to saturations predicted by reservoir simulations. This step allows obtaining maps of fluid distribution (saturation) several hundreds of meters from the wellbores 102 and 104, deep inside the reservoirs. In some aspects, method 150 may be repeated in an iterative process, thus providing a view of changes in saturation and injectant front location with time (time-lapse monitoring).

In some aspects, method 150 can generate many different realizations of reservoir properties by using the same crosswell EM response. In addition to the crosswell EM response, integration of other deep reservoir data sources (for example, gravity measurement, seismic response, sonic and resistivity logs) with reservoir property modeling may reduce uncertainty. For instance, reservoir parameters that are more sensitive (relatively) to the crosswell EM response may be identified and those can be updated with multiple realizations which can be used for assisted history matching.

As another example, the petrophysical model, and thus a position of the flood front can be generated with deep reading gravity measurements. For example, deep reservoir gravity measurements may correspond to the bulk density of the formation, $\rho_b$. This variable is governed by the Equation 2:

$$\beta_b = \rho_m(1-\phi) + \phi(S_w\rho_w + S_o\rho_o + S_g\rho_g),$$  Equation 2

Where $\rho_b$=bulk density (from gravity meter data), $\rho_m$=matrix density (from mineralogy), $\rho_w$=water density (computed from the salinity of the water at reservoir conditions), $\rho_o$=oil density (known Phase Behavior data at reservoir conditions), $\rho_g$=gas density (known phase behavior data at reservoir conditions), $\phi$=porosity (from well logs), $S_w$=water saturation, $S_o$=oil saturation, and $S_g$=gas saturation. Generally, the sum of the oil, water, and gas saturation equals 1, and the parameters of oil saturation and gas saturation can be combined into a single $S_{hydrocarbon}$ with a single average density, $\rho_{hydrocarbon}$.

Figure 10:
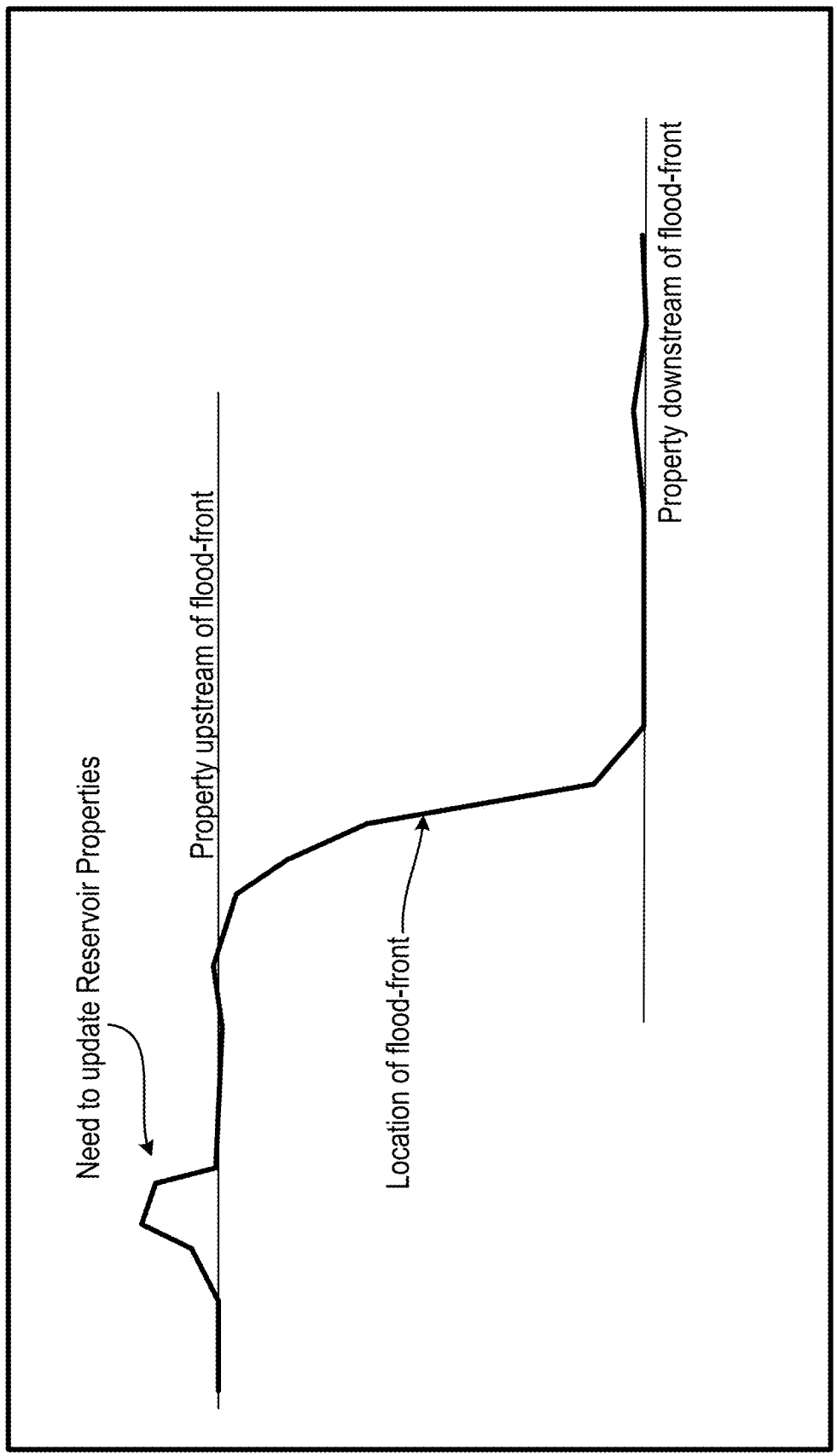
FIG. 10 illustrates a chart that shows location and movement of a flood-front through a mapping of first and or second derivatives (rates of changes).

As yet another example, particular deep reservoir measurements (for example, crosswell EM) or a combination of deep reservoir measurements described previously can be used to detect the location and movement of the flood-front by computing and plotting or mapping first and or second derivatives (rates of changes), as shown in the FIG. 10. The change in such derivatives may be used to detect and map the flood-front location. Unexpected changes in derivatives away from the front may indicate a need to update one or more reservoir properties and update the petrophysical model.

Method 150 may continue at step 156, which includes determining, based on the petrophysical model, a flow of an injectant from the injection wellbore toward the production wellbore. For example, as described previously, the petrophysical model can include the determination of the floodfront, or saturation ($S_{water} + S_{hydrocarbon} = 1$). The saturation indicates a floodfront position, which shows where the injectant has flowed from the injection wellbore 102 toward the production wellbore 104.

Step 156 can also include updating the petrophysical model using a Bayesian inference (for example, an ensemble Kalman filter) using the deep reservoir measurements. The difference in front propagation velocity interpreted from any deep reservoir measurement will be compared to that evaluated from simulation results. The difference can be used to revise reservoir grid-block petrophysical properties, and thus, the petrophysical model generated in step 154. For example, an initial geological model can be prepared based on, for instance, seismic horizons, well logs, and core data. Petrophysical properties (for example, porosity and permeability) between the wellbores 102 and 104 can be distributed based on Gaussian simulation with multiple realizations. Representative relative permeability curves obtained from steady/unsteady state corefloods are used to simulate multiphase flow during flooding. After processing the deep reservoir data, a snapshot of a saturation map at a specific time can be developed. A flooding simulation can be run up to the time at which deep reading measurements is acquired. Saturation map obtained from the simulation can be compared with the one calculated from deep reading measurements. If there is not an agreement, the permeability field will be modified until a reasonable history match is obtained (for example, with a history matching tool, such as, CMG CMG-CMOST from Computer Modeling Group of Calgary, Alberta, Canada, or any other comparable optimization tool). As the injectant front moves during flooding, each successive deep reading measurement can provide more information about the distribution of petrophysical properties (for example, porosity and permeability). The simulation model can therefore be updated after each deep reservoir measurement.

Method 150 may continue at step 158, which includes adjusting an inflow control device (ICD) positioned about the production wellbore based on the determined flow of the injectant. For example, certain ICDs 106 may be closed to prevent the floodfront from reaching the production wellbore 104 at certain intervals (for example, perforation zones of the wellbore 104). Further, certain ICDs 106 may be opened to allow hydrocarbons pushed by the floodfront to reach the production wellbore 104 in certain intervals (for example, perforation zones of the wellbore 104).

One or more optimization algorithms can be run on the petrophysical model to optimize one or more control settings for the ICDs 106. For example, multiple simulations can be conducted using a calibrated (for example, history-matched) model and compared to select the ICD control settings that would result in an optimum recovery. In some instances, an optimum recovery may include mitigating an early injectant breakthrough into the production wellbore 104. In some instances, an optimum recovery may include directing, through control of the ICDs 106, a hydrocarbon flow through particular intervals in the wellbore 104 so as to push the floodfront away from such intervals. ICDs, in some aspects, may be either open or closed, while ICVs, in some aspects, may be controllably modulated between 0% open and 100% open. When deep reservoir measurements are not in real time, adjustment of the ICV/ICDs 106 may depend on how frequently these measurements are conducted.

Method 150 may be iteratively executed (for example, looped back to step 152 after step 158). For example, additional deep reservoir measurements can be taken or identified in step 152 after adjustment of the ICDs/ICVs 106. In some instances, additional measurements can be taken or identified after each successive ICD activation and used to evaluate the ongoing success of the ICD schedule and further revise the reservoir property distribution. Previous deep reservoir measurements (from a previous iteration or iterations) may be compared to the most recent, or current, deep reservoir measurements to calibrate the simulation model and change the settings of the ICDs/ICVs 106. The resulting change in measurements, subsequent to settings changes, can provide feedback of a systemic reservoir hydraulic response to the ICD changes.

The iterative process may be ended, for example, once a determination has been made that a robust version of the petrophysical model has been achieved that doesn't change with time. As another example, the iterative process may stop when it is determined that the deep reservoir measurements do not change with a change in ICD/ICV control settings. As another example, the iterative process may be ended when hydrocarbon recovery is stopped.

FIG. 2 illustrates several synthetic geomodels with different heterogeneity in a permeability field in the previously described simulation model (FIGS. 1A and 1B) of an injectant detection system and process. FIG. 2 shows the different synthetic geomodels that may be built during the simulation process of the injection wellbore 102 and the production wellbore 104 (shown in FIGS. 1A-1B) to investigate an effect of heterogeneity in a permeability field on oil recovery, water production, and breakthrough. For example, the more heterogeneous a reservoir (rock formation) is, the more variable the rock properties in that reservoir may be. For example, shale gas reservoirs are heterogeneous formations whose mineralogy, organic content, natural fractures, and other properties can vary from place to place. Other rock formations may be more homogeneous, where properties do not vary from location to location. As shown in the models 200, a measure of permeability (in millidarcys) between the wellbore 102 and 104 can vary. By using these geomodels in the simulation process (which may include up to 50,000 simulations using different geomodels), the heterogeneity of the reservoir can be accounted for.

Figure 3A:
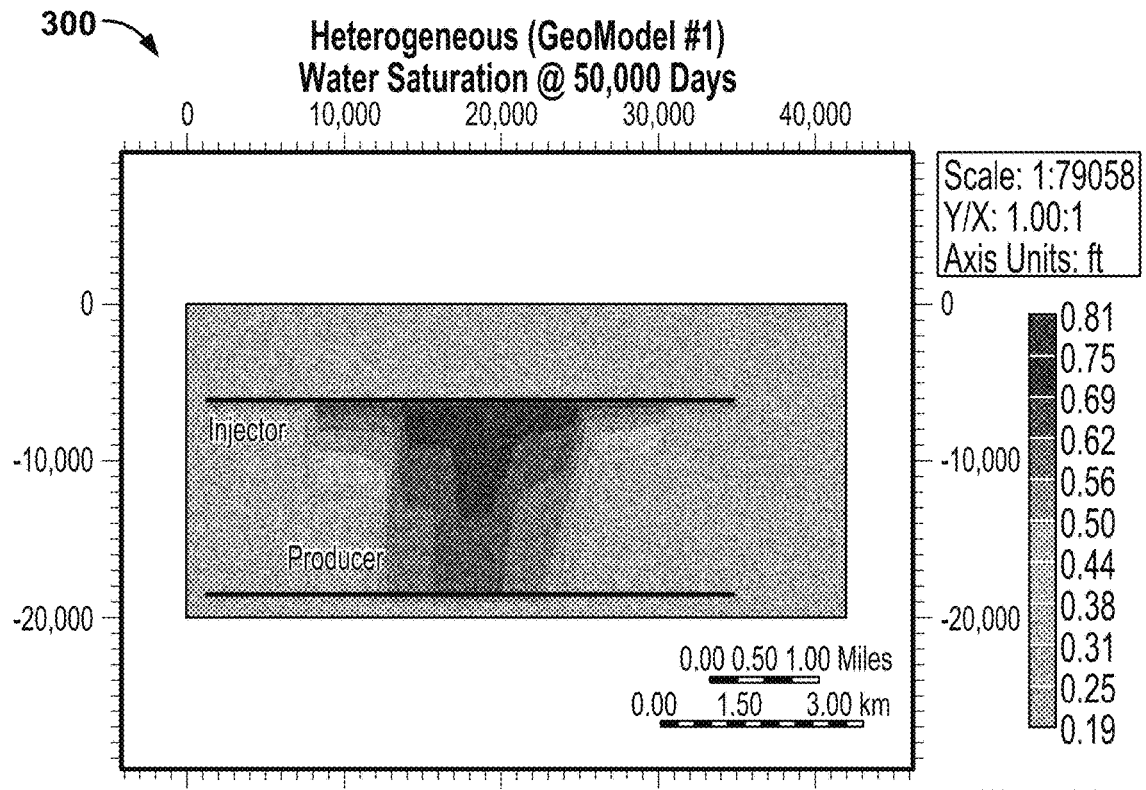
FIGS. 3A-3B illustrate water saturation maps for heterogeneous and homogeneous cases that do not include ICDs or ICVs in a simulation model.
Figure 3B:
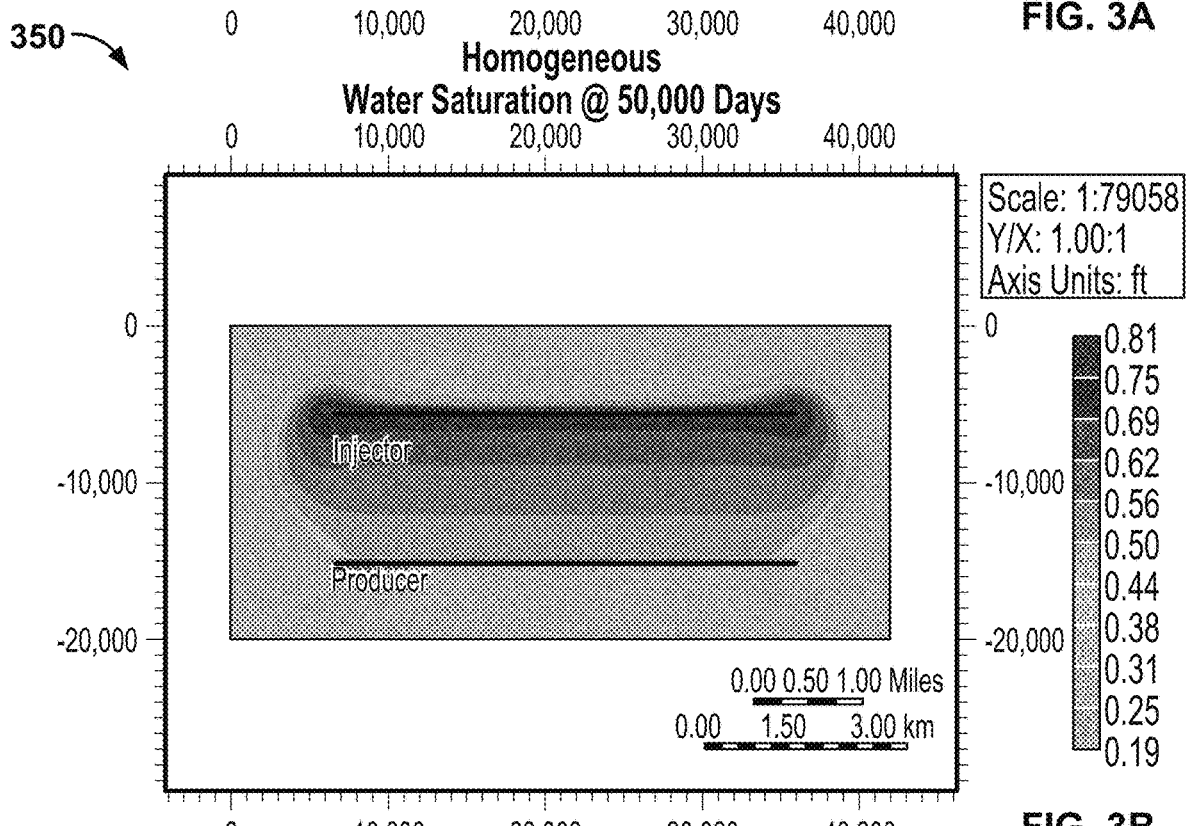

FIGS. 3A and 3B illustrate water saturation maps for heterogeneous and homogeneous cases that do not include ICDs or ICVs in a simulation model of an injectant detection system and process. For example, water displaces oil more uniformly in homogeneous reservoirs than it does in heterogeneous reservoirs. The water phase prefers to flow through the least resistant pathway from the injector 102 to the producer 104. Therefore, a water breakthrough for a heterogeneous case (such as the GeoModel #1 from FIG. 2 that is used in this simulation) occurs much earlier than that for a homogeneous case. FIG. 3A shows a graph 300 that shows a water saturation map (in other words, flow of a water injectant from the wellbore 102 to the wellbore 104) over a 50,000 day simulation in a heterogeneous model (GeoModel #1). FIG. 3B shows a graph 350 that shows a water saturation map (in other words, flow of a water injectant from the wellbore 102 to the wellbore 104) over a 50,000 day simulation in a homogeneous model. As illustrated, the water saturation front is much different, for example, more concentrated at certain production intervals, for the heterogeneous case as compared to the homogenous case.

Figure 4A:
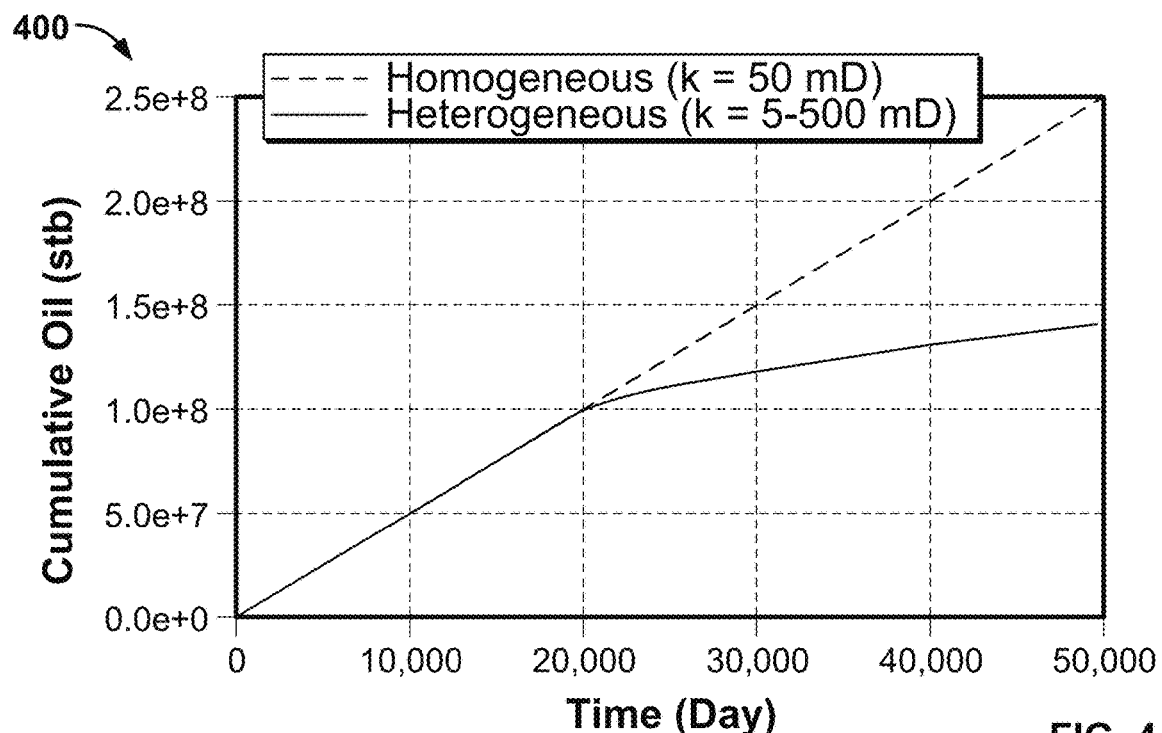
FIGS. 4A-4B illustrate cumulative oil and water production graphs over time in heterogeneous and homogeneous cases that do not include ICDs or ICVs in a simulation model.
Figure 4B:
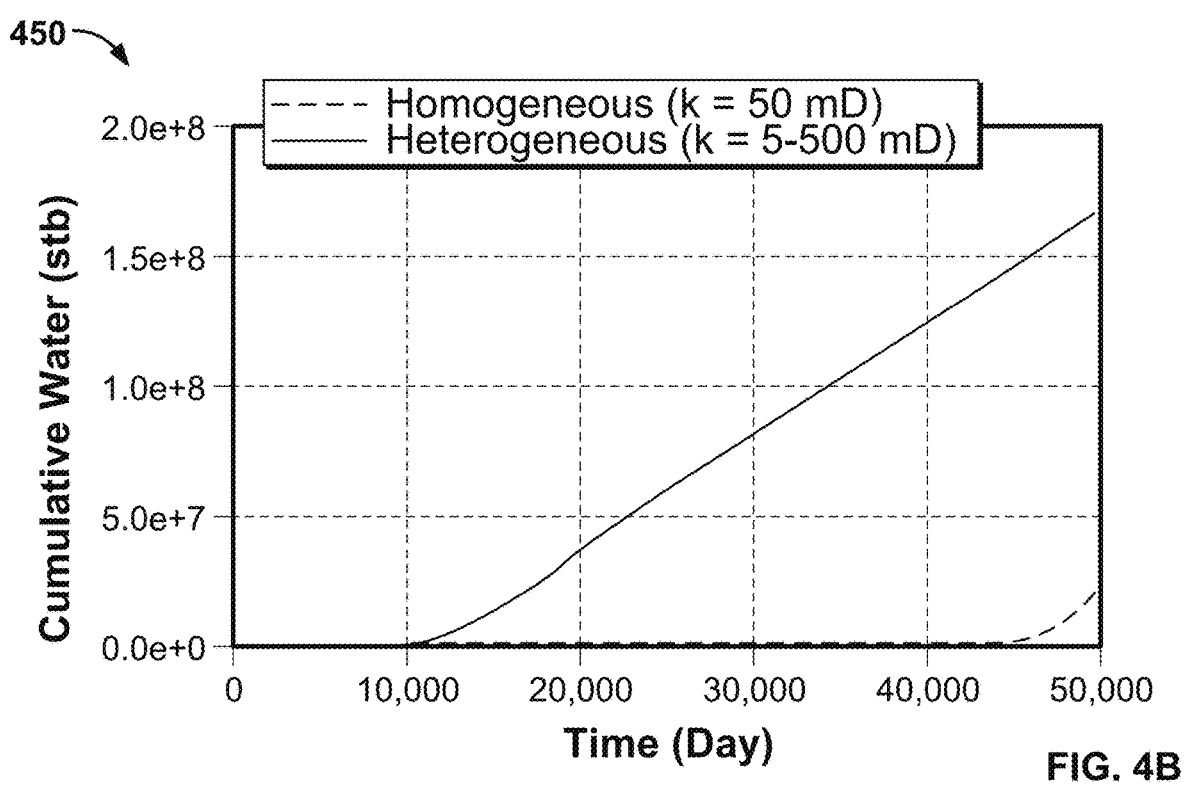

FIGS. 4A and 4B illustrate cumulative oil and water production graphs over time in heterogeneous and homogeneous cases that do not include ICDs or ICVs in a simulation model of an injectant detection system and process. Graphs 400 and 450 show cumulative oil production and cumulative water production, respectively, from the production well 104 in both the homogeneous case (dotted lines) and heterogeneous case (solid lines) from water saturation models 300 and 350. As shown, heterogeneity in a permeable field leads to lower oil recovery and higher water production with an early breakthrough of the injectant. This results in lower areal sweep efficiency and 40% lower oil recovery in the heterogeneous case in this simulation.

Figure 5A:
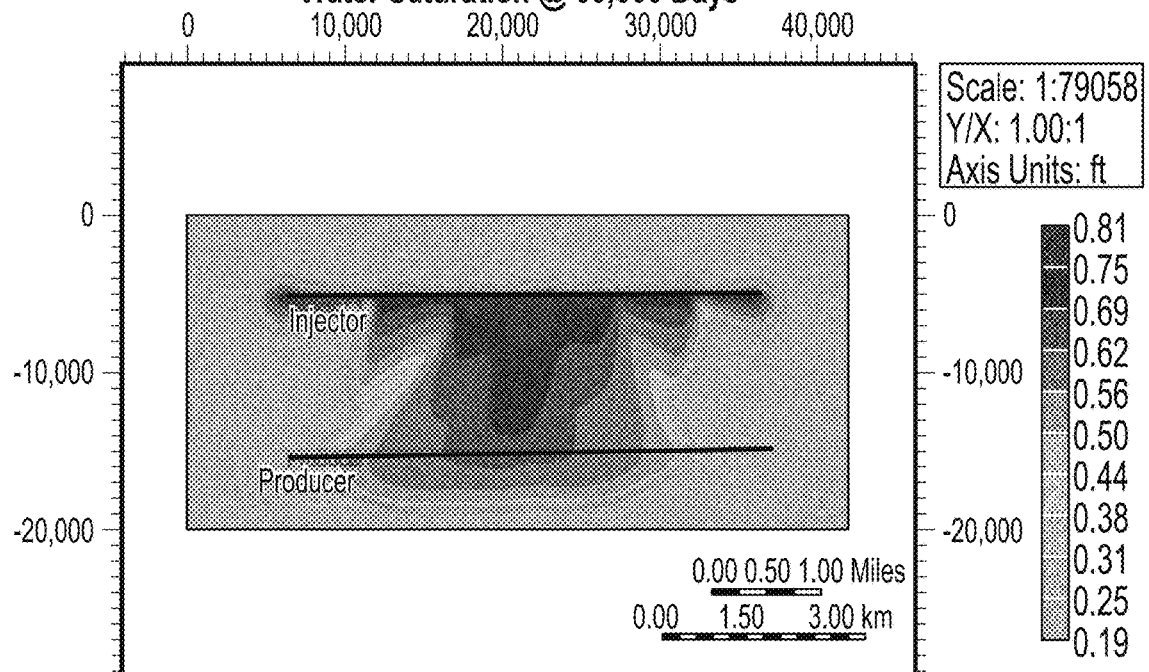
FIGS. 5A-5B illustrate water saturation maps for heterogeneous and homogeneous cases that include ICDs or ICVs in a simulation model.
Figure 5B:
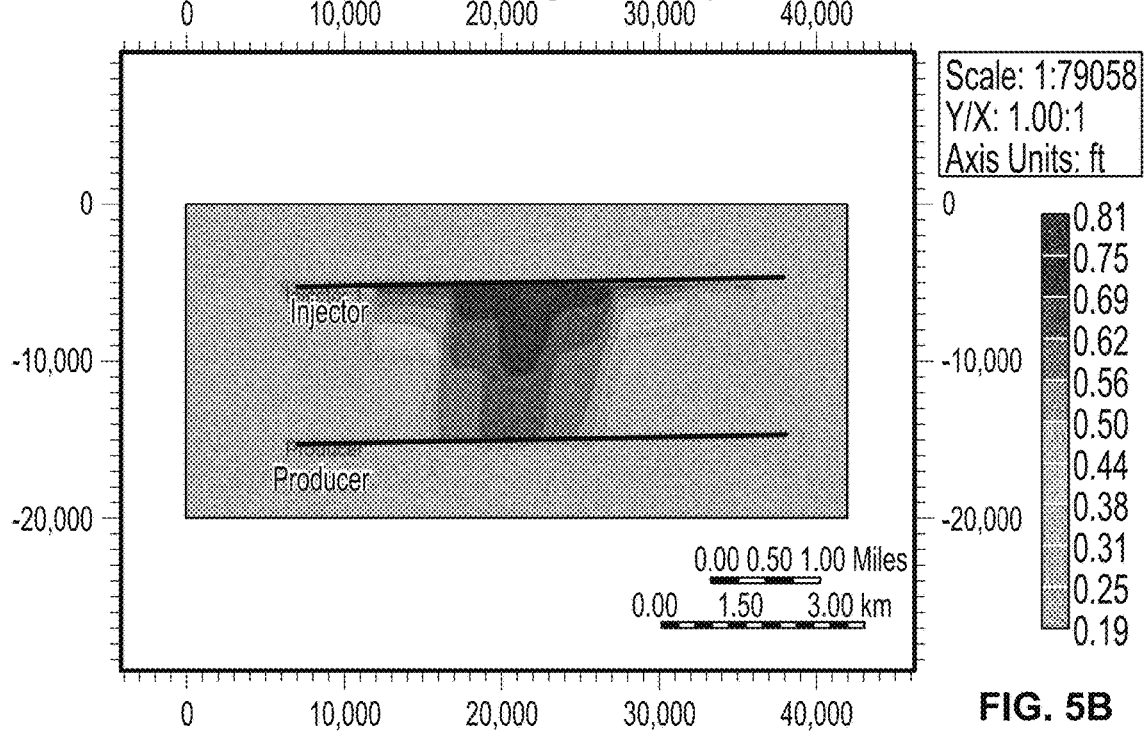

FIGS. 5A and 5B illustrate water saturation maps for heterogeneous and homogeneous cases that include ICDs or ICVs in a simulation model of a conventional injectant detection system and process. For example, in a simulation in which ICD/ICV control is used according to the injectant detection process described in FIG. 1C, improvement in an areal sweep efficiency can be significant according to the simulation. In the simulation, when a water front is detected at the production wellbore 104, one or more ICV/ICD is controlled (for example, shut in) if the flowing injectant stream exceeds 10% watercut. In other words, in the simulation water saturation model shown in FIG. 5A, the ICDs/ICVs are controlled subsequent to waterflood detection as is conventionally done. Such action in the simulation may show a diversion of the injectant from high permeability to low permeability regions of the reservoir adjacent the production wellbore 104. An improved sweep efficiency results in higher oil production and lower water production with delayed breakthrough of the injectant.

FIG. 5A shows a water saturation model 500 when the ICDs/ICVs are controlled as described previously. FIG. 5B shows a water saturation model 550 which does not include IC Ds/ICVs and, therefore, is the same as the water saturation model 300. As shown in model 500, controlling the ICV/ICDs at the production wellbore 104 improves areal sweep efficiency significantly, helping divert water from high permeability to low permeability regions.

Figure 6A:
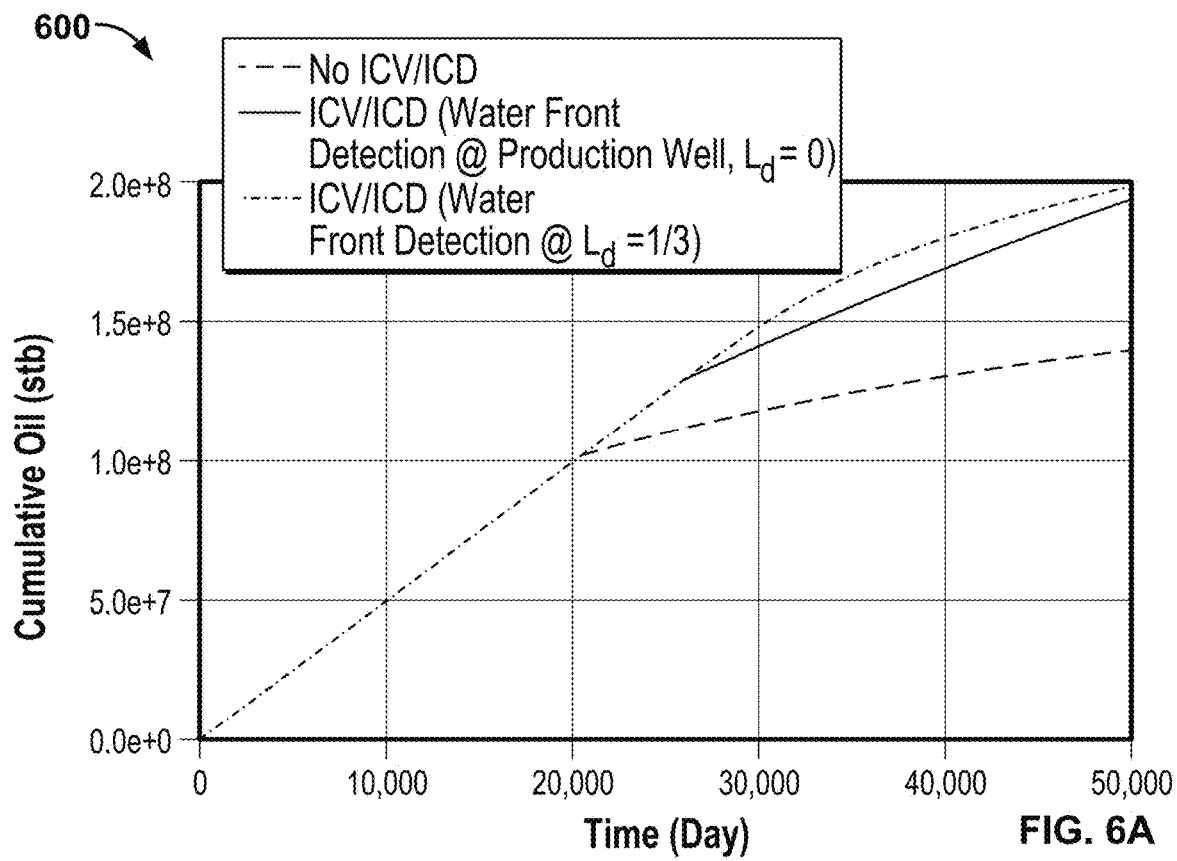
FIGS. 6A-6B illustrate cumulative oil and water production graphs over time in cases that include ICDs or ICVs with early detection of injectant flood front in a simulation model.
Figure 6B:
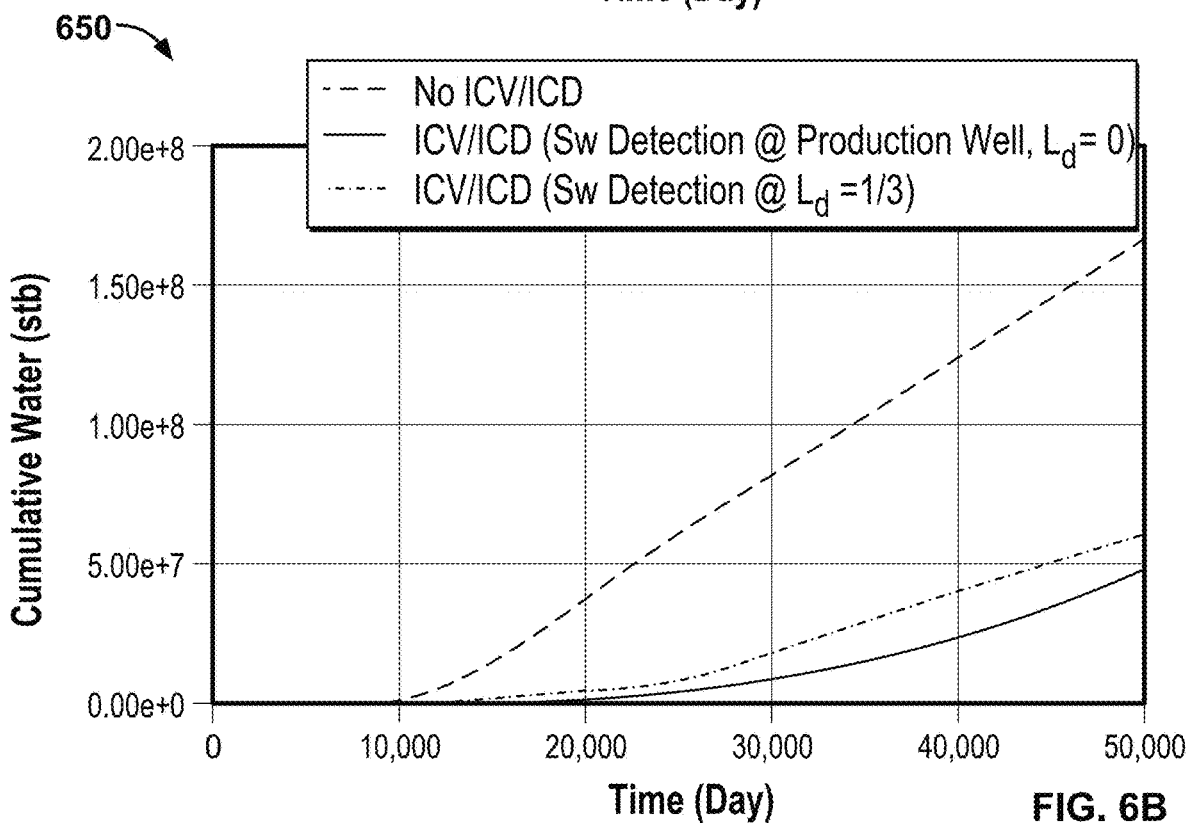

FIGS. 6A and 6B illustrate cumulative oil and water production graphs over time in cases that include LCDs or ICVs with early detection of injectant flood front in a simulation model of an injectant detection system and process according to, for example, method 150 and the present disclosure. For example, FIG. 5A shows an ICD/ICV control scheme in which such devices are controlled (for example, shut in) after water is detected after its breakthrough. FIGS. 6A and 6B, however, show graphs 600 and 650 of cumulative oil production and cumulative water production, respectively, from a simulation in which deep reservoir measurements are used (according to method 150) for pre-breakthrough detection of a water front. In this simulation, $L_d$ is used as a dimensionless distance between the injector 102 and the producer 104, which ranges from 0 at the producer 104 to 1 at the injector 102. Thus, if $L_d=0$, then the water front is detected at the production well. If $L_d=\frac{1}{3}$, then it is detected at a distance of one-third of the well spacing from the producer 104. As shown in the graph 600 of FIG. 6A, cumulative oil production increases based on control (for example, closing) of the ICDs/ICVs based on earlier water front detection (here, $L_d$ of ⅓ vs. $L_d$ of 0 or no ICD/ICV control). However, as shown in FIG. 6B, increased oil production may also be accompanied by a slight increase in water production as shown in graph 650. This may result from heterogeneity in the permeability field.

Figure 7:
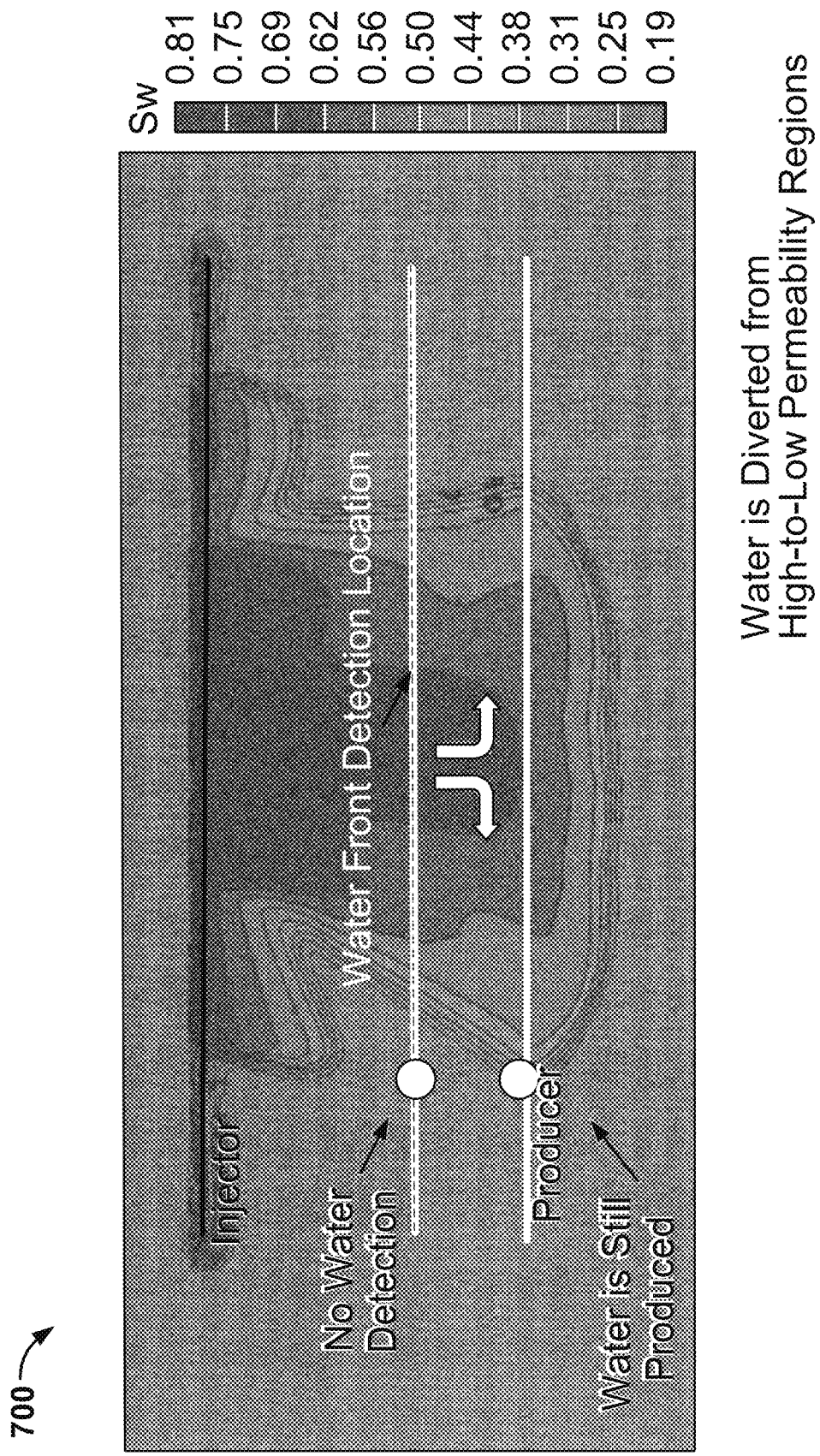
FIG. 7 illustrates effects of operation of ICDs or ICVs on a production wellbore due to early detection of an injectant flood front in a simulation model.

FIG. 7 illustrates effects of operation of ICDs or ICVs on a production wellbore due to early detection of an injectant flood front in a simulation model of an injectant detection system and process. For example, based on the location of the floodfront, water front detection may not occur adjacent or close to (for example, at a chosen distance, $L_d$, from the wellbore 104) some ICDs/ICVs at certain intervals of the production wellbore 104 may not be closed as the water front moves toward the wellbore 104. Further, the closing of ICDs/ICVs at other intervals may direct the water front from high to low permeability regions of the reservoir adjacent the wellbore 104. The graph 700 shown in FIG. 7 illustrates this concept, showing that at some ICV/ICDs (for example, near the circle on the line representing the producer 104), water production is continued even after its breakthrough, since no water front is detected at a distance from the production well 104 due to diversion. As a result, those ICV/ICDs are not triggered to shut in. Therefore, not only changes in saturation at a distance away from the production well 104 but also changes in watercut at each ICV/ICDs should be considered to trigger ICVs/ICDs.

Figure 8:
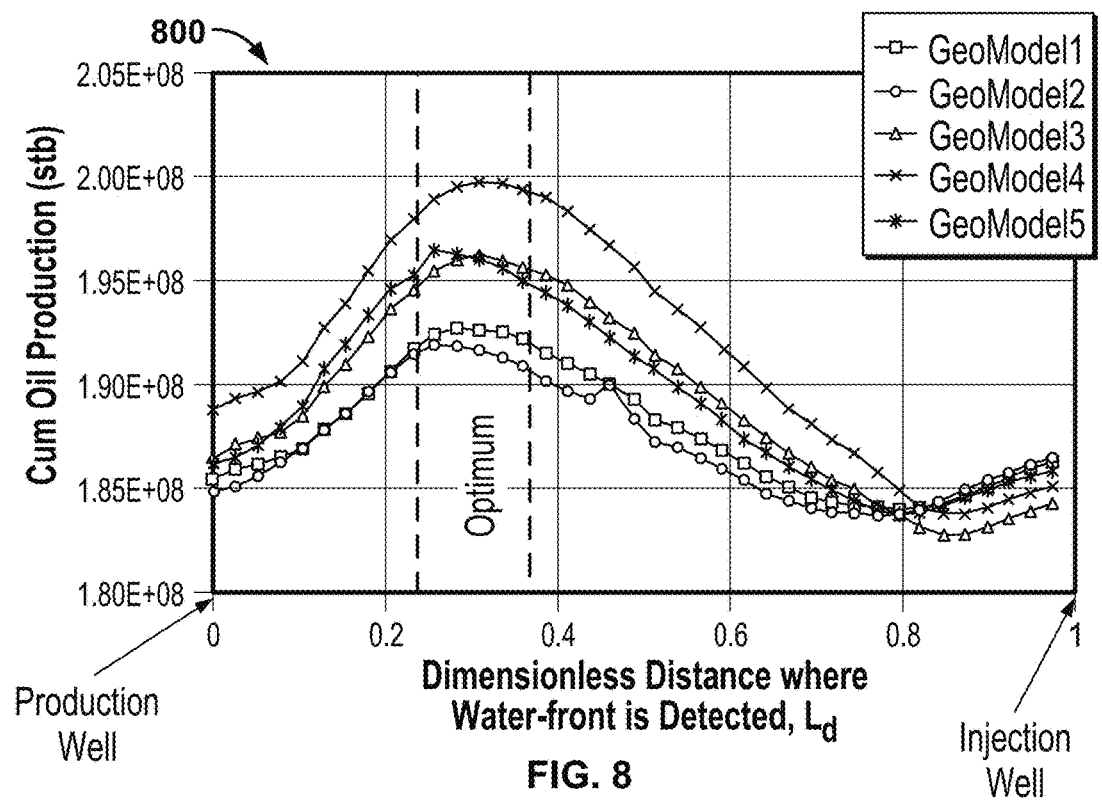
FIG. 8 illustrates optimum locations for early injectant-front detection for several different geomodels in a simulation model.

FIG. 8 illustrates optimum locations for early injectant-front detection for several different geomodels in a simulation model of an injectant detection system and process. For example, due to the problems discussed with reference to FIG. 7 (non-detection of a water front leading to water production through uncontrolled ICDs/ICVs), it may be preferable to determine an optimum location for early waterfront detection, $(L_d)_{opt}$, between the injector 102 and producer 104 to maximize oil production with ICDs/ICVs, while also minimizing water production.

The graph 800 illustrates simulations run with the five different synthetic geomodels (shown in FIG. 2) to show the effect of different heterogeneity in permeability field on the optimum location. Based on the simulations, in some aspects, $(L_d)_{opt}$ ranges from 0.25 to 0.35 independent of the geomodels used in the simulations. Thus, detecting the water front (for example, taking deep reservoir measurements) about ⅔ of the distance from the injector 102 (and ⅓ of the distance to the producer 104) led to the best results in cumulative oil production according to the simulations.

According to the simulations executed and shown in the figures, the injectant detection system and process, when utilized to control ICDs/ICVs on a producer, can yield higher cumulative oil production. In some aspects, benefits of proactively controlling ICDs/ICVs based on early front detection can improve sweep efficiency and reduce water production in horizontal waterfloods. Further, early detection of a water front with deep reservoir measurements to control ICDs/ICVs provides incremental oil recovery. In some aspects, an optimum location for early water-front detection exists between an injector and a producer to improve oil production at the specified injection and production constraints. Also, deep reservoir measurements may also provide valuable information about mobility field, which can be used to reduce uncertainty in geological models for better history matching and production forecasting.

Figure 9:
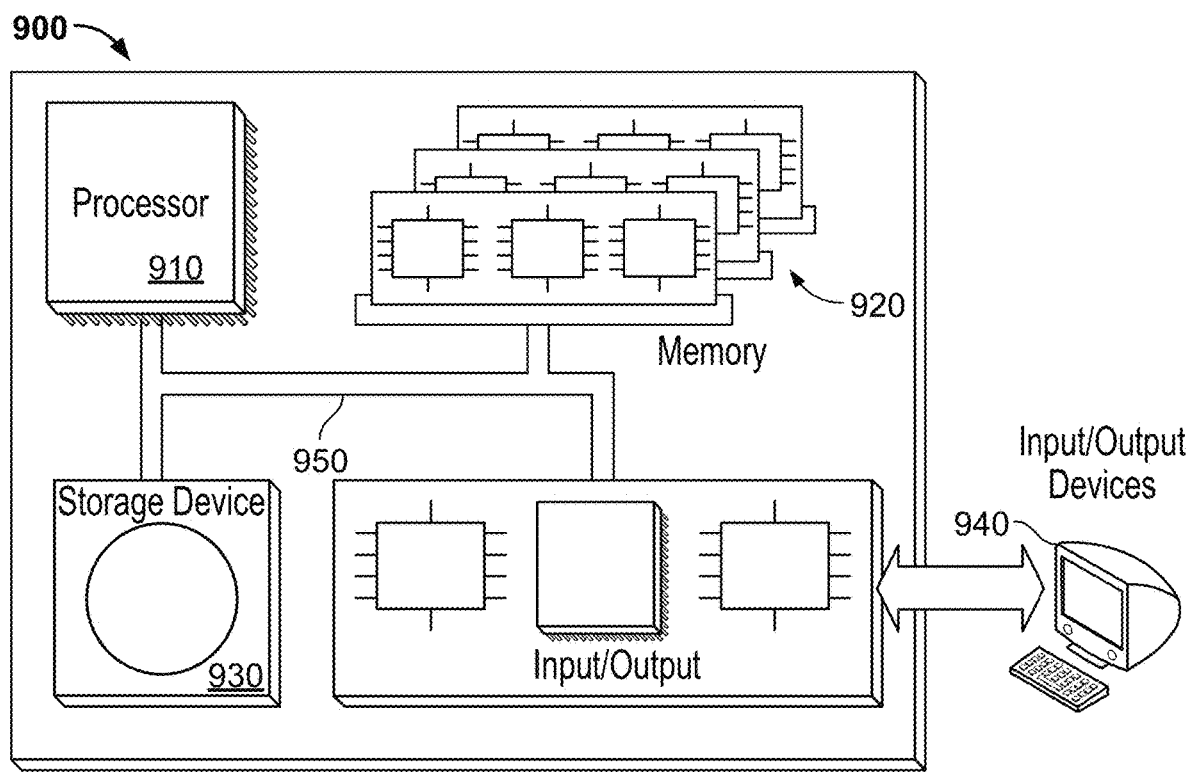
FIG. 9 depicts a schematic diagram of a control system that may be applied to any of the computer-implemented methods and other techniques described in the present disclosure.

FIG. 9 is a schematic diagram of a computer system 900. The system 900 can be used to carry out the operations described in association with any of the computer-implemented methods described previously, according to some implementations, such as implementations of an injectant detection system and process. In some implementations, computing systems and devices and the functional operations described in this specification can be implemented in digital electronic circuitry, in tangibly-embodied computer software or firmware, in computer hardware, including the structures disclosed in this specification (for example, system 900) and their structural equivalents, or in combinations of one or more of them. The system 900 is intended to include various forms of digital computers, such as laptops, desktops, workstations, personal digital assistants, servers, blade servers, mainframes, and other appropriate computers, including vehicles installed on base units or pod units of modular vehicles. The system 900 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 400. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular implementations of the present disclosure have been described. Other implementation s are within the scope of the following claims. For example, the actions recited in the claims can be performed in a different order and still achieve desirable results.

What is claimed is:

1. A control system communicably coupled to one or more inflow control devices (ICDs) and configured to perform operations comprising:
    (i) identifying a plurality of reservoir measurements of a subterranean hydrocarbon reservoir located between at least one injection wellbore and at least one production wellbore, the reservoir measurements comprising at least one of crosswell electromagnetic (EM), borehole EM, surface electromagnetics, gravity measurements, or 4D seismic;
    (ii) processing the identified plurality of reservoir measurements to generate a petrophysical model of the subterranean hydrocarbon reservoir;
    (iii) determining, based on the petrophysical model, a flow of an injectant from the injection wellbore toward the production wellbore;
    (iv) adjusting an inflow control device (ICD) positioned about the production wellbore based on the determined flow of the injectant; and
    (v) executing an iterative process of steps (i) through (iv), the iterative process comprising comparing a previous plurality of reservoir measurements with a current plurality of reservoir measurements.

2. The control system of claim 1, further comprising receiving the plurality of reservoir measurements from one or more sensors positioned at at least one of:
    a terranean surface; or
    in the reservoir between the injection wellbore and the production wellbore.

3. The control system of claim 2, wherein processing the identified plurality of reservoir measurements comprises inverting the reservoir measurements to determine the petrophysical model that comprises a water saturation value at a plurality of locations in the reservoir between the injection wellbore and the production wellbore.

4. The control system of claim 3, wherein inverting the reservoir measurements comprises executing the Archie algorithm to the reservoir measurements.

5. The control system of claim 4, wherein determining the injectant flow comprises determining a floodfront between the injection wellbore and the production wellbore, the floodfront comprising a sum of the water saturation and a hydrocarbon saturation value at the plurality of locations.

6. The control system of claim 4, wherein determining the injectant flow comprises updating the petrophysical model using a Bayesian inference with the plurality of reservoir measurements.

7. The control system of claim 6, wherein updating the petrophysical model using the Bayesian inference with the plurality of reservoir measurements comprises updating the petrophysical model using an ensemble Kalman filter.

8. The control system of claim 4, further comprising:
    determining a threshold location between the injection wellbore and the production wellbore; and
    determining the flow of the injectant at the threshold location; and
    adjusting the ICD based on the flow of the injectant at the threshold location exceeding a predetermined value.

9. The control system of claim 8, further comprising stopping the iterative process when a difference between the current plurality of reservoir measurements and the previous plurality of reservoir measurements is less than a threshold value.

10. The control system of claim 9, wherein adjusting the inflow control device (ICD) positioned about the production wellbore based on the determined flow of the injectant comprises:
    adjusting at least a portion of a plurality of ICDs positioned about the production wellbore to restrict the flow of the injectant into the production wellbore; and
    adjusting another portion of the plurality of ICDs positioned about the production wellbore to allow a flow of hydrocarbons into the production wellbore.

11. The control system of claim 1, wherein processing the identified plurality of reservoir measurements comprises inverting the reservoir measurements to determine the petrophysical model that comprises a water saturation value at a plurality of locations in the reservoir between the injection wellbore and the production wellbore.

12. The control system of claim 11, wherein inverting the reservoir measurements comprises executing the Archie algorithm to the reservoir measurements.

13. The control system of claim 11, wherein determining the injectant flow comprises determining a floodfront between the injection wellbore and the production wellbore, the floodfront comprising a sum of the water saturation and a hydrocarbon saturation value at the plurality of locations.

14. The control system of claim 11, wherein inverting the reservoir measurements to determine the petrophysical model comprises obtaining a probable distribution of resistivity in the subterranean hydrocarbon reservoir that is compatible with the plurality of reservoir measurements.

15. The control system of claim 14, wherein the inversion comprises an inference of the probable distribution of resistivity in the subterranean hydrocarbon reservoir.

16. The control system of claim 1, wherein determining the injectant flow comprises updating the petrophysical model using a Bayesian inference with the plurality of reservoir measurements.

17. The control system of claim 1, further comprising:
   determining a threshold location between the injection wellbore and the production wellbore; and
   determining the flow of the injectant at the threshold location; and
   adjusting the ICD based on the flow of the injectant at the threshold location exceeding a predetermined value.

18. The control system of claim 1, further comprising stopping the iterative process when a difference between the current plurality of reservoir measurements and the previous plurality of reservoir measurements is less than a threshold value.

19. The control system of claim 1, wherein the plurality of reservoir measurements comprise a plurality of reservoir gravity measurements that correspond to a bulk density of the subterranean hydrocarbon reservoir governed by the equation:

$$\rho_b = \rho_m(1-\phi) + \phi(S_w\rho_w + S_o\rho_o + S_g\rho_g)$$

where $\rho_b$ is bulk density, $\rho_m$ is matrix density, $\rho_w$ is water density, $\rho_o$ is oil density, $\rho_g$ is gas density, $\phi$ is porosity, $S_w$ is water saturation, $S_o$ is oil saturation, and $S_g$ is gas saturation.

20. The control system of claim 1, wherein adjusting the inflow control device (ICD) positioned about the production wellbore based on the determined flow of the injectant comprises:
   adjusting at least a portion of a plurality of ICDs positioned about the production wellbore to restrict the flow of the injectant into the production wellbore; and
   adjusting another portion of the plurality of ICDs positioned about the production wellbore to allow a flow of hydrocarbons into the production wellbore.

* * * * *